US012532327B2

(12) United States Patent
Khoshnevisan et al.

(10) Patent No.: US 12,532,327 B2
(45) Date of Patent: Jan. 20, 2026

(54) SPATIAL DIMENSION FOR UPLINK CANCELLATION INDICATION

(71) Applicant: QUALCOMM Incorporated, San Diego, CA (US)

(72) Inventors: Mostafa Khoshnevisan, San Diego, CA (US); Seyedkianoush Hosseini, San Diego, CA (US); Xiaoxia Zhang, San Diego, CA (US); Tao Luo, San Diego, CA (US); Fang Yuan, Beijing (CN); Yitao Chen, San Diego, CA (US); Yan Zhou, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 459 days.

(21) Appl. No.: 17/999,094

(22) PCT Filed: Jul. 21, 2020

(86) PCT No.: PCT/CN2020/103310
§ 371 (c)(1),
(2) Date: Nov. 17, 2022

(87) PCT Pub. No.: WO2022/016382
PCT Pub. Date: Jan. 27, 2022

(65) Prior Publication Data
US 2023/0217459 A1    Jul. 6, 2023

(51) Int. Cl.
*H04W 72/232*    (2023.01)
(52) U.S. Cl.
CPC ................................ *H04W 72/232* (2023.01)
(58) Field of Classification Search
CPC ... H04L 5/0053; H04L 1/1812; H04L 5/0091; H04L 25/0226; H04L 1/1664;
(Continued)

(56) References Cited

U.S. PATENT DOCUMENTS 11,723,018 B2    8/2023  Wang et al.
2021/0168783 A1*  6/2021  Islam ................... H04L 5/0053
(Continued)

FOREIGN PATENT DOCUMENTS

CN    101651601 A    2/2010
CN    110366245 A    10/2019
(Continued)

OTHER PUBLICATIONS

International Search Report and Written Opinion—PCT/CN2020/103310—ISA/EPO—Mar. 9, 2021.
(Continued)

*Primary Examiner* — Jung Liu
(74) *Attorney, Agent, or Firm* — Patterson + Sheridan, L.L.P.

(57) ABSTRACT

Certain aspects of the present disclosure provide techniques for receiving an uplink cancelation indication (ULCI) with a number of bits that indicate resources on which one or more uplink channels are to be modified; determining, from at least two uplink transmission groups characterized by different spatial parameters, at least one uplink transmission group to which a received ULCI applies in a component charrier; and modifying the one or more uplink channels that belong to the determined uplink transmission group in accordance with the ULCI. For example, modifying the one or more uplink channels includes at least partially canceling the one or more uplink channels if the resources indicated in the ULCI overlap with the resources of the one or more uplink channels. The one or more uplink channels may include at least one of: one or more physical uplink shared channels (PUSCHs) or one or more PUSCH repetitions.

27 Claims, 15 Drawing Sheets

(58) Field of Classification Search
CPC .. H04L 25/0224; H04L 1/1854; H04W 72/56; H04W 72/1268; H04W 72/23; H04W 72/569; H04W 74/0816; H04W 74/006; H04W 74/0808; H04W 74/002
See application file for complete search history.

(56) References Cited

U.S. PATENT DOCUMENTS

| | | | | |
|---|---|---|---|---|
| 2021/0307070 A1* | 9/2021 | Kim | ............... | H04L 25/0226 |
| 2022/0159683 A1* | 5/2022 | Islam | ............ | H04W 72/1268 |
| 2023/0078723 A1* | 3/2023 | Kim | ............. | H04W 74/0816 |
| | | | | 370/329 |

FOREIGN PATENT DOCUMENTS

| | | |
|---|---|---|
| WO | 2019108340 | 6/2019 |
| WO | 2019160332 A1 | 8/2019 |
| WO | 2019184681 A1 | 10/2019 |
| WO | 2020033660 A1 | 2/2020 |

OTHER PUBLICATIONS

Motorola Mobility, et al., "Enhanced Inter UE Tx Prioritization/Multiplexing for URLLC", R1-1911300, 3GPP TSG RAN WG1 #98bis, Chongqing, China, Oct. 14-20, 2019, Oct. 20, 2019 (Oct. 20, 2019) Sections 2.2, 8 Pages.

Qualcomm: "Remaining Issues on Uplink Inter-UE Tx Multiplexing and Prioritization," 3GPP TSG RAN WG1 #100b-e, R1-2002548, Apr. 20-30, 2020, Apr. 10, 2020(Apr. 10, 2020), sections 2-7, 6 pages.

ZTE: "UL Inter-UE Multiplexing Between eMBB and URLLC," 3GPP TSG RAN WG1 Meeting #98, R1-1908239, Aug. 26-30, 2019, Aug. 17, 2019 (Aug. 17, 2019) sections 3-6, 11 pages.

MCC Support: "Draft Report of 3GPP TSG RAN WG1 #97 v0.3.0 (Reno, USA, May 13-17, 2019)", 3GPP TSG-RAN WG1 Meeting #98, R1-190xxxx, Draft_Minutes_Report_RAN1#97_V030, 3rd Generation Partnership Project, Mobile Competence Centre, 650, Route Des Lucioles, F-06921 Sophia-Antipolis Cedex, France, vol. RAN WG1, No. Prague, Czech Rep, Aug. 26, 2019-Aug. 30, 2019, May 29, 2019, XP051740228, 157 pages, chapter 7.2.8.3 on pp. 114 and 115, chapter 7.2.6.5 on pp. 101 and 102.

Supplementary European Search Report—EP20946138—Search Authority—The Hague—Mar. 11, 2024.

* cited by examiner

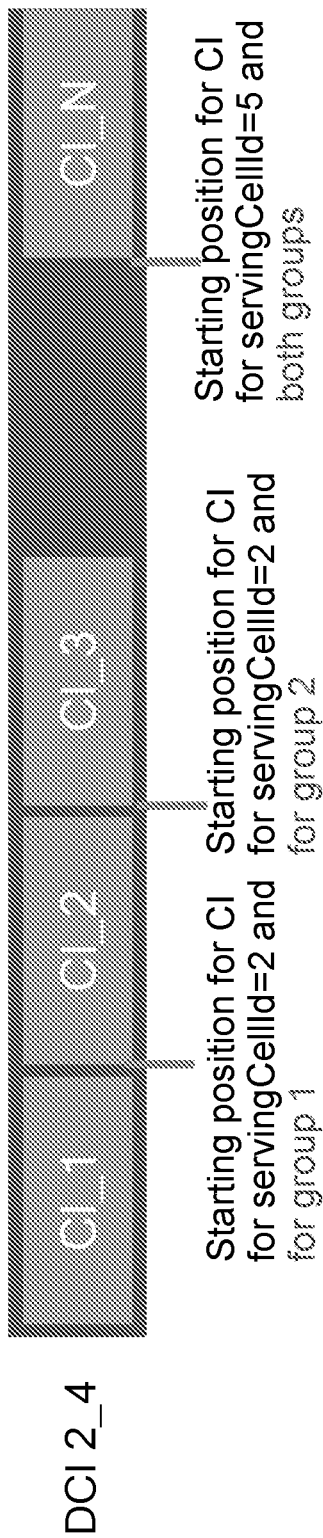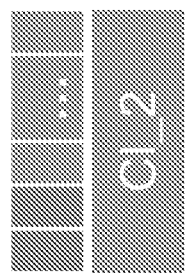
FIG. 15A
FIG. 15B

SPATIAL DIMENSION FOR UPLINK CANCELLATION INDICATION

CROSS-REFERENCE TO RELATED APPLICATION(S)

This application is a national stage application under 35 U.S.C. 371 of PCT/CN2020/103310, filed Jul. 21, 2020, which is hereby expressly incorporated by reference herein in its entirety as if fully set forth below and for all applicable purposes.

FIELD OF THE DISCLOSURE

Aspects of the present disclosure relate to wireless communications, and more particularly, to techniques for indicating a preemption (or cancellation) of uplink resources to a user equipment (UE).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving an uplink cancelation indication (ULCI) with a number of bits that indicate resources on which one or more uplink channels are to be modified; determining, from at least two uplink transmissions groups characterized by different spatial parameters, at least one uplink transmission group to which the ULCI applies in a component carrier; and modifying the one or more uplink channels that belong to the determined uplink transmission group in accordance with the ULCI.

Certain aspects provide a method for wireless communication by a network entity. The method generally includes sending, to a first UE a ULCI with a number of bits that indicate resources on which one or more uplink channels are to be modified and an indication, from at least two uplink transmissions groups characterized by different spatial parameters, at least one uplink transmission group to which the ULCI applies in a component carrier; and communicating with the first UE taking into account modification, by the first UE, of the one or more uplink channels that belong to the determined uplink transmission group in accordance with the ULCI.

Aspects also include various apparatuses, means, and computer readable mediums having instructions for performing the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 15A and 15B illustrate example CI fields, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
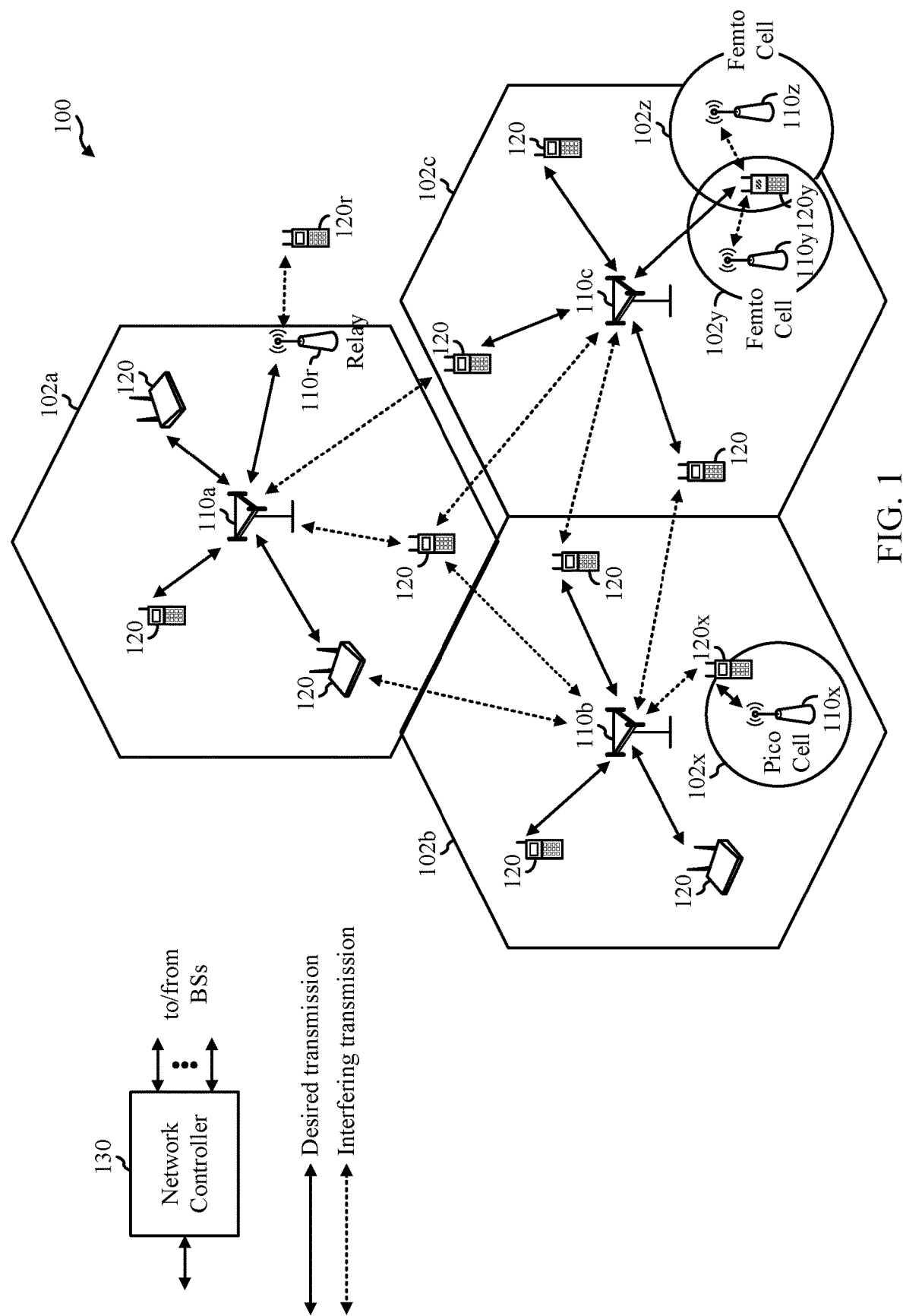
FIG. 1 is a block diagram conceptually illustrating an example telecommunications system, in accordance with certain aspects of the present disclosure.

Aspects of the present disclosure provide apparatus, methods, processing systems, and computer readable mediums for signaling and processing an uplink cancelation indication (ULCI) that may take into account that different uplink transmission groups that may be associated with different spatial parameters and, as a result, applying the ULCI differently to different such groups.

For example, techniques are disclosed to determine at least one physical uplink shared channel (PUSCH) group to which the ULCI applies in a component carrier, from at least two PUSCH groups characterized by different spatial parameters, and modifying the one or more uplink channels that belong to the determined PUSCH group in accordance with the ULCI.

In certain systems, such as NR (new radio or 5G) systems, a scheduled PUSCH may be cancelled by another PUSCH transmission. For example, NR supports a variety of services (service types) including enhanced mobile broadband (eMBB) and ultra-reliable low-latency communications (URLLC). In some cases, PUSCH transmissions of a first user equipment (UE) may be cancelled according to ULCI due to PUSCH transmissions (e.g., of URLLC) of a second UE if such transmission occupy conflicting frequency or time resources with the PUSCH transmissions of the first UE.

An eMBB PUSCH may be preempted by a URLLC PUSCH. The base station (BS) provides an ULCI to the UE, indicating the preempted resources, which may help improve decoding performance at the BS. Similarly, an eMBB PDSCH may be preempted by a URLLC PDSCH. In this case, the BS may provide a downlink preemption indicator (DLPI), also referred to as an uplink cancelation indicator (DLCI), to the UE, indicating the preempted resources, which may help improve decoding performance at the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100, such as a New Radio (NR) or 5G network, in which aspects of the present disclosure may be performed. For example, a BS 110 may ensure that the UE 120 can process the ULCI in time to modify one or more uplink channels belonging to an uplink transmission group that is determined from at least two uplink transmission groups characterized by different spatial parameters, due to preemption by a higher priority channel. The UE 120 may be configured to perform operations 1200 of FIG. 12, while BS 110 is configured to perform operations 1300 of FIG. 13.

The wireless communication network 100 may support enhanced mobile broadband (eMBB) and ultra-reliable low-latency communication (URLLC) services. A base station (BS), such as a BS 110 may schedule physical uplink shared channel (PUSCH) transmissions from a user equipment (UE), such as a UE 120. The BS 110 may preempt the scheduled PUSCH with another PUSCH. For example, the BS 110 may schedule a UE to transmit a relatively low priority channel (e.g., an eMBB PUSCH) and, subsequently schedule the UE to transmit a relatively high priority channel (e.g., a URLLC PUSCH) using resources that overlap the first (lower priority) scheduled transmission. In such cases, the BS 110 may send the UE 120 an ULCI indicating the preempted resources.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20

Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
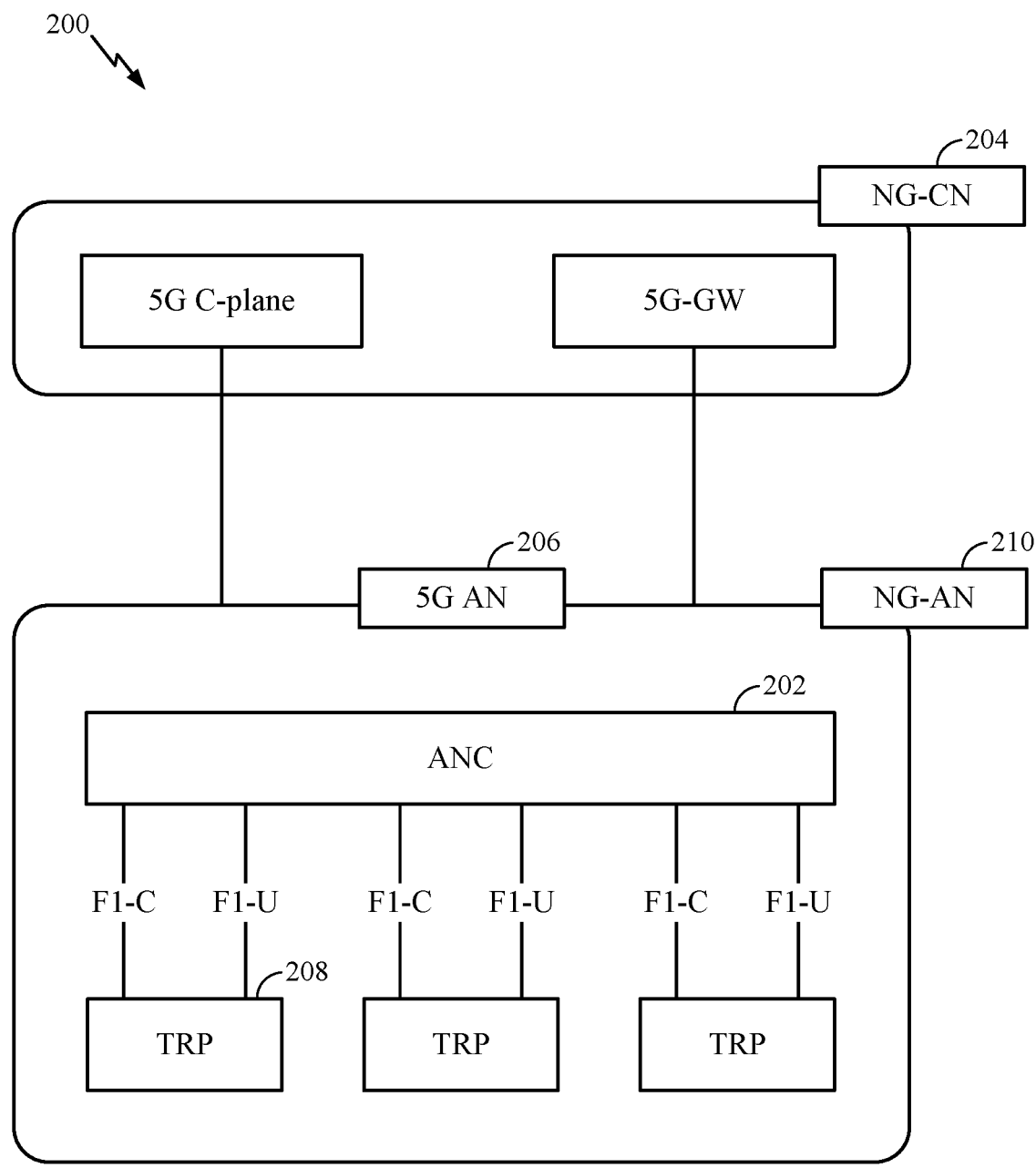
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an ANC 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
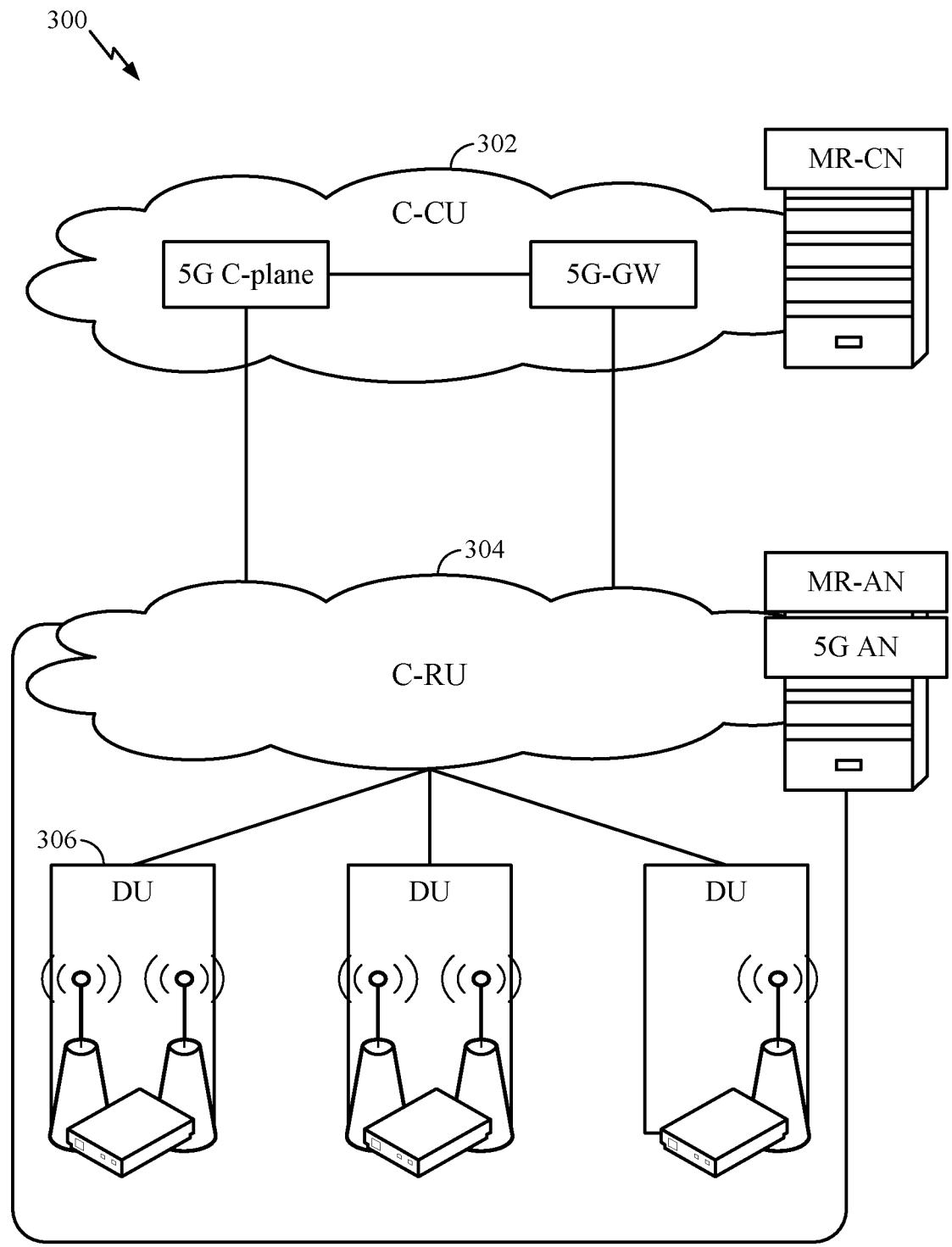
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
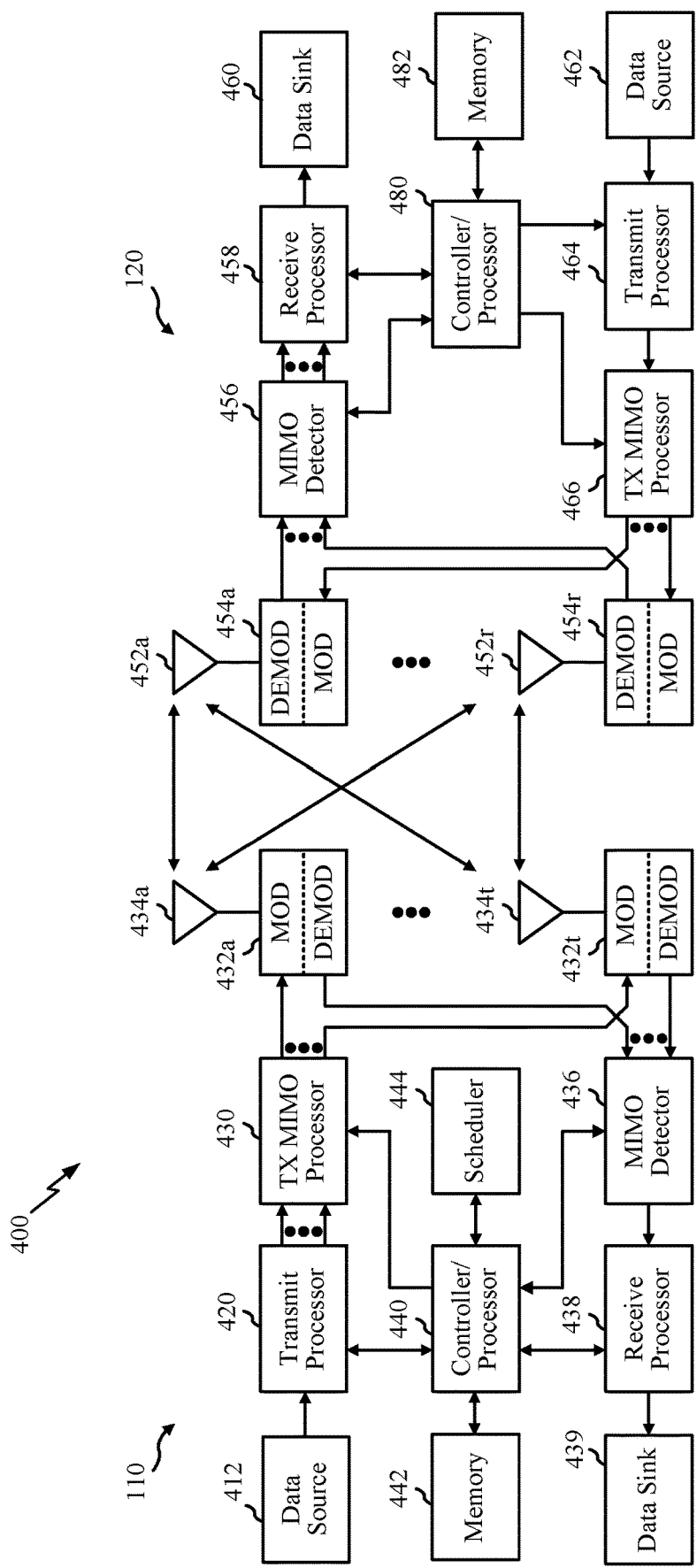
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be configured to perform (or cause UE 120 to perform) operations 1200 of FIG. 12 and/or antennas 434, processors 420, 460, 438, and/or controller/processor 440 of the BS 110 may be configured to perform (or cause BS 110 to perform) operations 1300 of FIG. 13, for PUSCH processing in the presence of ULCI.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DE-MODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
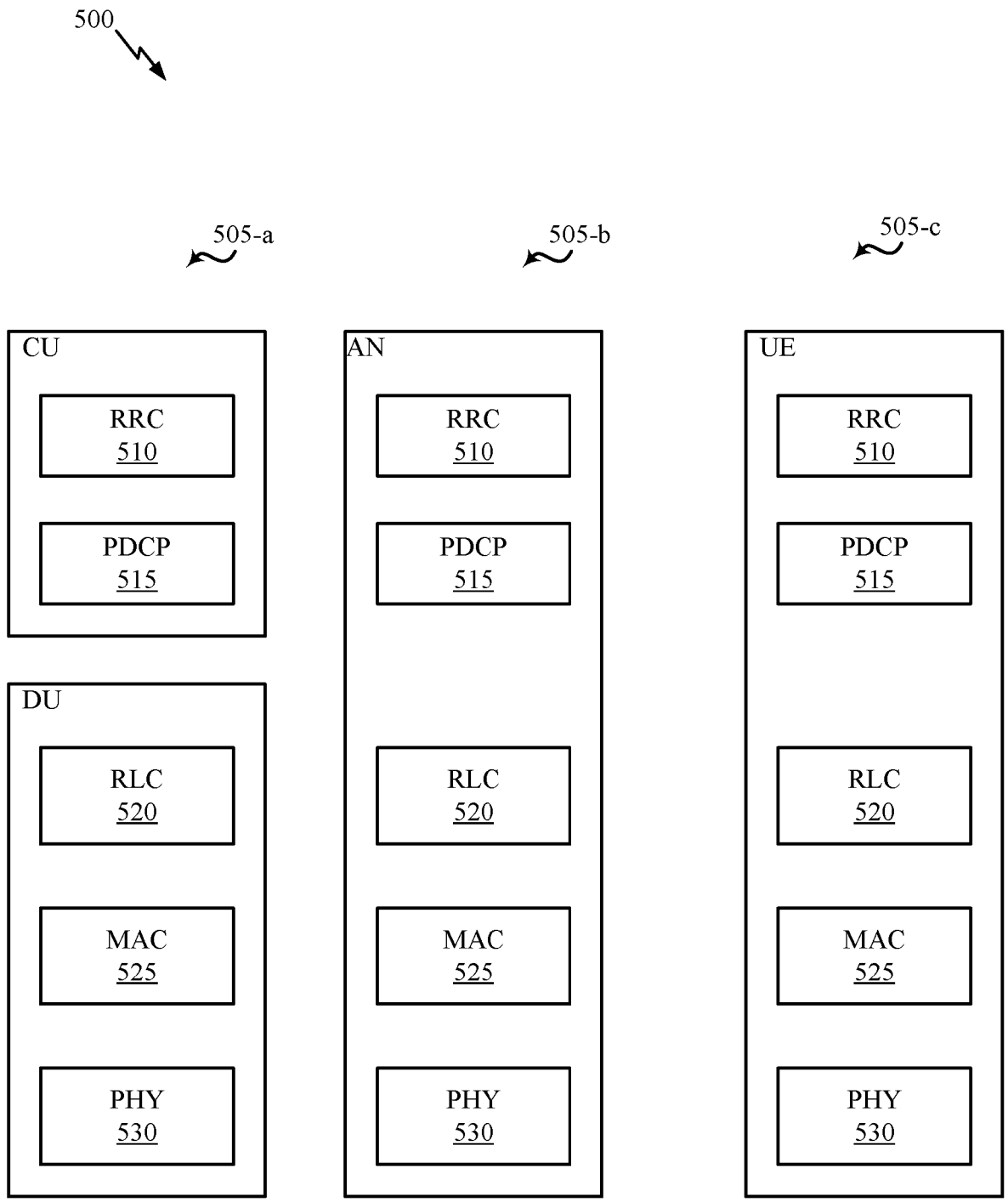
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 306 in FIG. 3). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
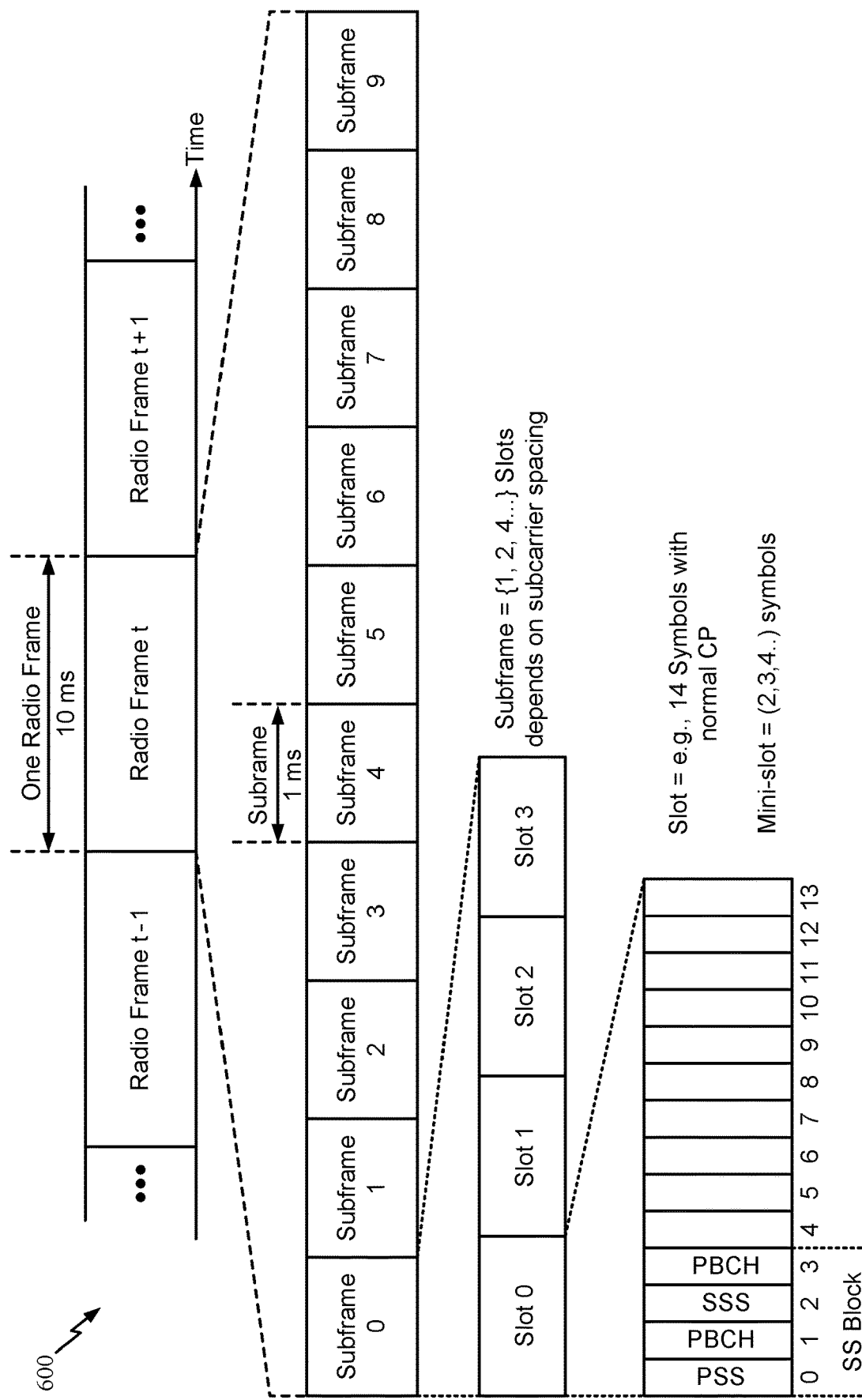
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information (SI), such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a PDSCH in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example ULCI Application Based on Spatial Parameters

Certain aspects of the present disclosure provide techniques for utilizing uplink cancelation indication (ULCI) that takes into account uplink transmission dependencies on uplink beams. For example, the techniques may utilize a ULCI with an indication of one or more of multiple uplink transmission groups characterized by different spatial parameters. The ULCI is to be applied to the one or more uplink transmission groups that interfere with another uplink transmission (such as one of a higher priority or urgency from another UE).

In certain systems, such as NR (new radio or 5G) systems, a scheduled PUSCH may be preempted by another PUSCH transmission. For example, as noted above, NR supports a variety of services including enhanced mobile broadband (eMBB) and ultra-reliable low-latency communications (URLLC). An eMBB PUSCH may be preempted by a URLLC PUSCH, in a manner prioritizing URLLC traffic over eMBB traffic. Preemption, in this context, means that the entity transmitting eMBB data in PUSCH would stop (or at least cancel/puncture portions of) its eMBB transmission on the symbols preempted by URLLC- and a BS receiving the PUSCH interprets the preemption indication it sends in the same manner, allowing it to consider this when decoding.

Aspects of the present disclosure provide techniques that may help dynamically multiplex users with different services in the same time-frequency resources to have better spectrum utilization. As noted above, NR Rel-16 may support ULCI. ULCI is sent by the BS to the eMBB UE before the eMBB transmission occurs/ends (so the UE may cancel/puncture at least the portion of the eMBB transmission (e.g., preempted by URLLC).

The ULCI may indicated preemption of a set of resources using a number of bits in the DCI. Aspects of the present disclosure provide various techniques that may be considered mapping rules for mapping ULCI bits to corresponding groups of time and frequency resources subject to preemption.

Figure 7:
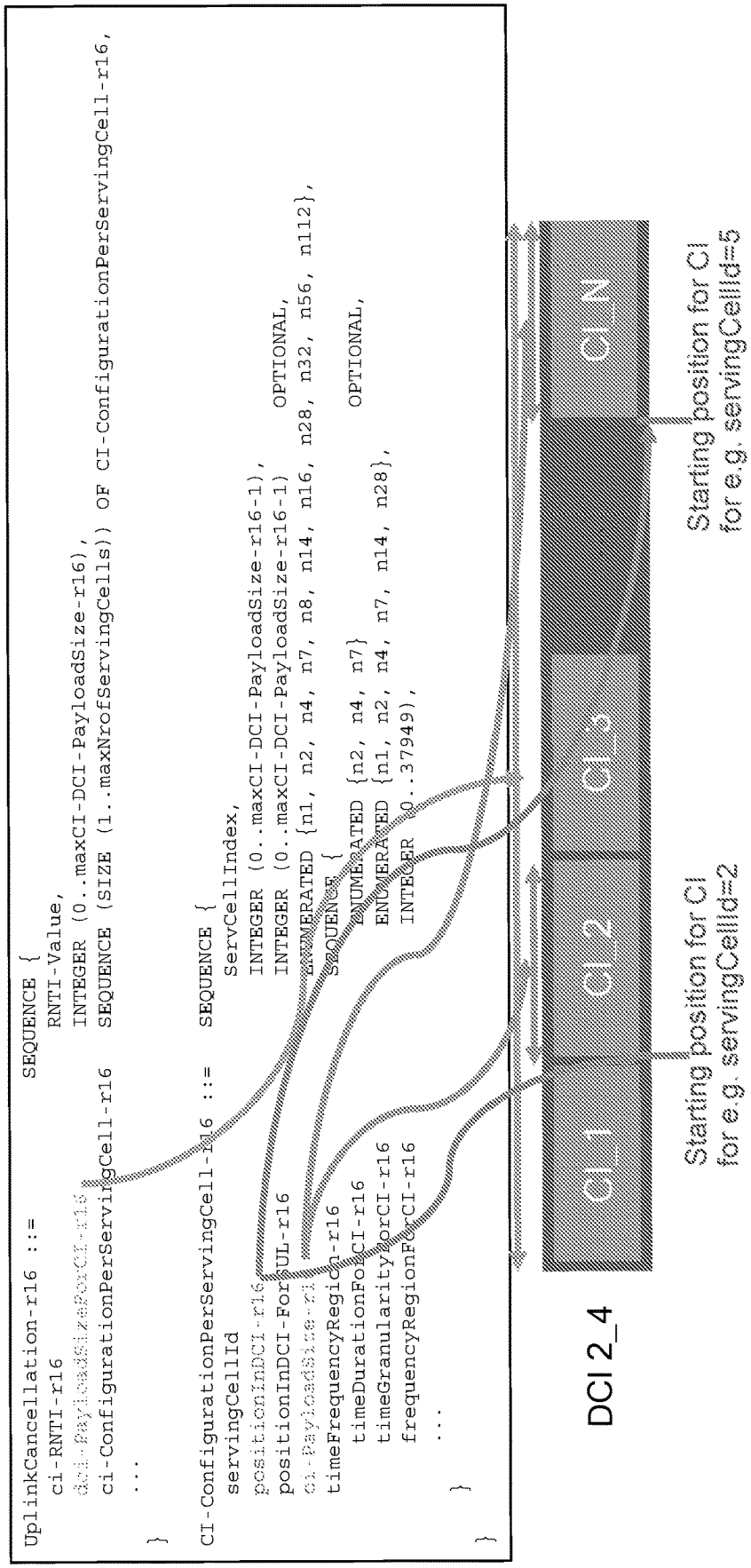
FIG. 7 illustrates an example configuration of uplink cancellation indication (ULCI), in accordance with certain aspects of the present disclosure.

FIG. 7 illustrates an example configuration of ULCI supported in NR Rel-16. An example code of radio resource control (RRC) configuration for the ULCI monitoring and its corresponding cancellation indication (CI) fields are shown. DCI format 2_4 is used to indicate the ULCI and has an overall payload size represented by the length of the DCI 2_4 representation. The starting positions for each CI corresponding to different serving cell IDs are defined in the DCI 2_4. The payload size of each CI is also configured. Details of each CI are shown in FIG. 8.

Figure 8:
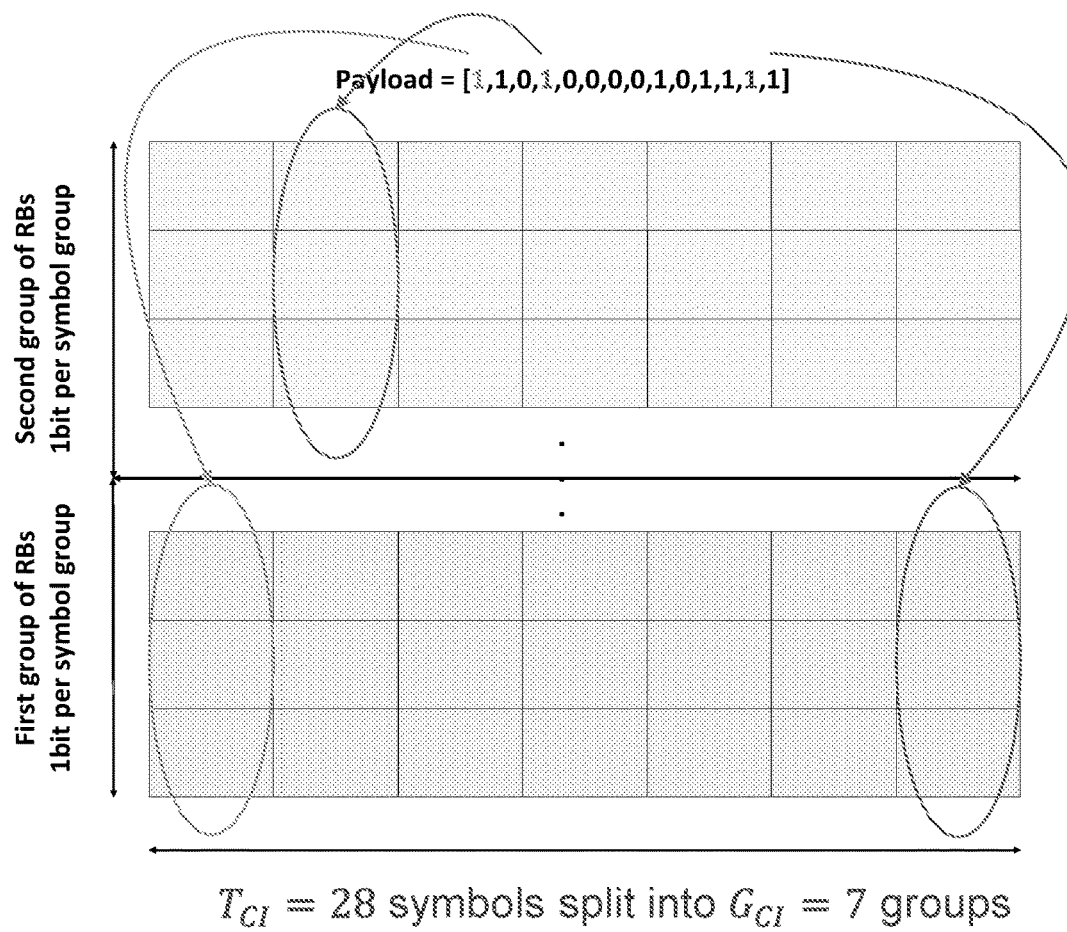
FIG. 8 illustrates an example mapping of cancellation indication (CI) field bits, in accordance with certain aspects of the present disclosure.

FIG. 8 illustrates an example CI field corresponding to a component carrier. As shown, the UE is provided with a CI payload size defined by a number of bits for the CI field in the DCI, and represented by $N_{CI}$. In this example, $N_{CI}$=14 bits. The CI field includes a number of resource blocks (RBs) defining the frequency span of ULCI, which is represented by $B_{CI}$. Here, $B_{CI}$=28 RBs. The time span of ULCI is defined using a number of symbols excluding the DL symbols. The time span is represented by $T_{CI}$, which equals to 28 symbols here and is split into 7 partitions or groups, represented by $G_{CI}$. Base on the CI field, the DCI can be interpreted to include a $G_{CI}$ sets of bits from $N_{CI}$ bits, which have a one-to-one mapping to the symbol groups. For each symbol group, $N_{BI}$ equals to $N_{CI}/G_{CI}$ bits from each set of bits and has a one-to-one mapping with $N_{BI}$ groups of physical resource blocks (PRBs). Here, $N_{CI}/G_{CI}$=2, thus there are two groups of RBs in frequency.

Figure 9:
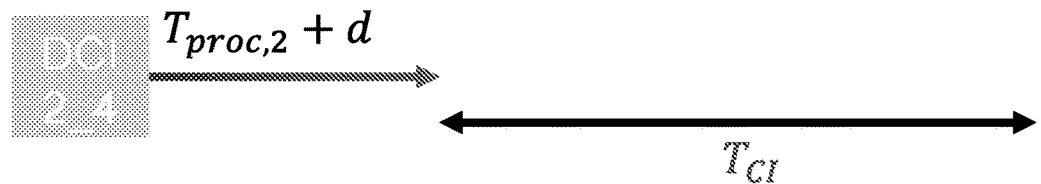
FIG. 9 illustrates an example timeline of downlink control information and processing time, in accordance with certain aspects of the present disclosure.

FIG. 9 illustrates an example arrangement of DCI and processing time. As shown, the first symbol of the TCI symbols starts after $T_{proc.2}$+d symbols from the end of PDCCH reception that carries DCI format 2_4, wherein d is reported as a UE capability and is selected from 0, 1, and 2 (i.e., d∈{0, 1, 2}). $T_{proc.2}$ is UE processing time for the corresponding PUSCH transmission. For example, $d_{2,1}$=0, when $N_2$ of minimum processing capability 2 is assumed.

Figure 10:
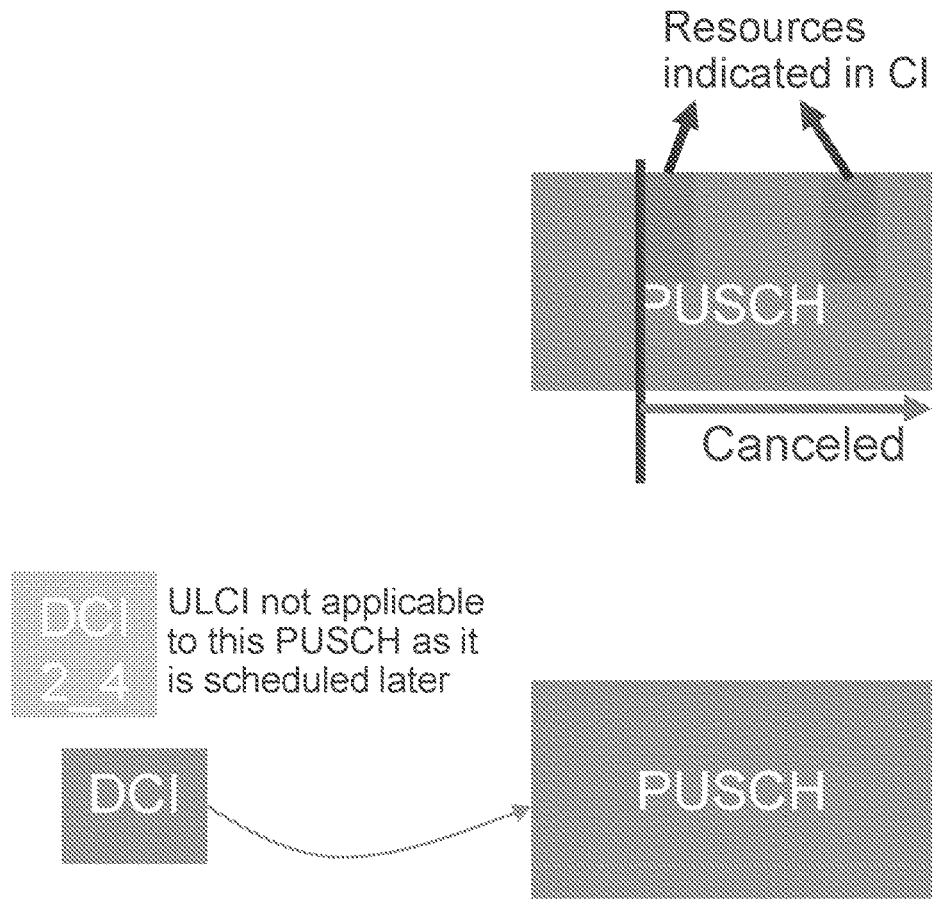
FIG. 10 illustrates an example application of spatial dependent ULCI, in accordance with certain aspects of the present disclosure.

FIG. 10 illustrates an example application of the indicated CI to cancel overlapping resources. Indicated CI is applicable only to PUSCH or SRS that have resources overlapping with the indicated canceled resources in the CI in time and frequency. When the indicated CI is applied to PUSCH, cancellation without resume may be supported, such as from the earliest indicated symbol to the end of the PUSCH. When the indicated CI is applied to SRS, the cancellation of the transmissions is on a symbol basis. As shown, in the upper PUSCH, the transmissions are cancelled because the resources of the PUSCH transmission are indicated in the CI.

If the PUSCH or SRS is scheduled by a DCI, the ULCI may only be applicable if the last symbol of the DCI is earlier than the first symbol of the DCI that carries the ULCI. For example, as shown in the lower PUSCH, the ULCI is not applicable to the PUSCH because it is scheduled later. In some aspects, the impact of priority of PUSCH may depend on RRC configuration applicabilityforCI. For example, if configured, cancelation may be applicable only to PUSCH with low priority (with priority 0). Otherwise, cancelation is applicable regardless of priority While conventional ULCI may have no dependency on UL transmission beams, aspects of the present disclosure propose ULCI that takes into account uplink transmission dependencies on uplink beams. In other words, the ULCI may not be applied in cases where spatial characteristics of an uplink transmission by one UE are such that it would not interfere with an uplink transmission of another UE, even if the uplink transmissions use overlapping resources.

Figure 11:
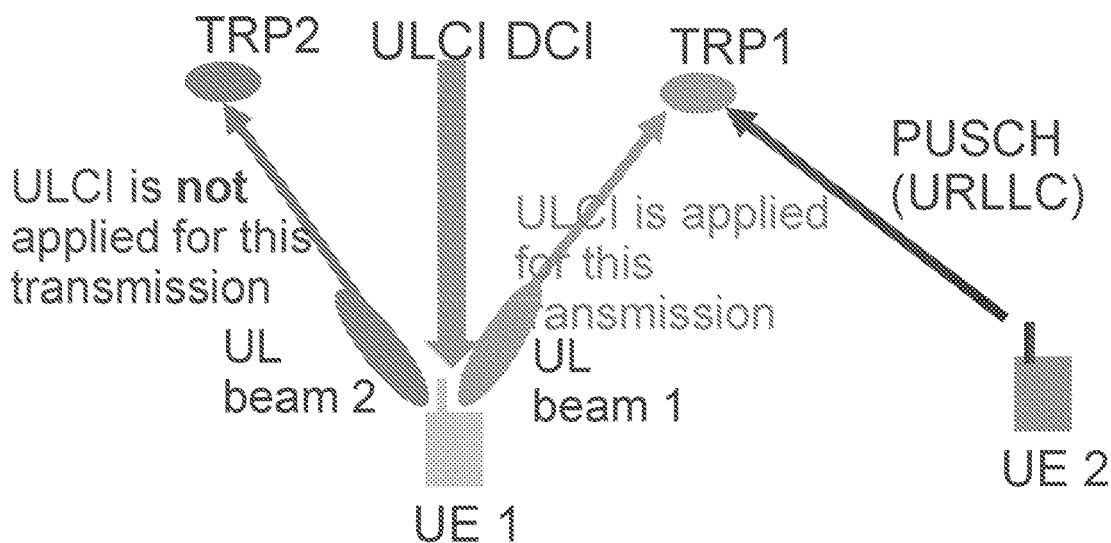
FIG. 11 illustrates an example application of spatial ULCI with two UEs, in accordance with certain aspects of the present disclosure.

FIG. 11 illustrates an example application of spatial ULCI, in accordance with aspects of the present disclosure. In the example configuration shown, UL beam 1 of UE1 transmitted to TRP1 may interfere with URLLC PUSCH transmitted by UE2 to TRP1 Because the URLLC PUSCH transmissions from UE2 has higher priority, the PUSCH from UE1 needs be canceled. On the other hand, UL beam 2 of UE1 transmitted to TRP2 is not interfered with URLLC PUSCH transmitted by UE2 and thus, UL beam 2 of UE 1 needs not be canceled.

In one example, one PUSCH with both UL beam 1 and UL beam 2 in a spatial division multiplexed (SDM) manner may be scheduled for UE1. In this case, one repetition of the PUSCH is transmitted with beam 1 and another repetition of the PUSCH is transmitted with beam 2. In case of TDM/FDM, determining the group of PUSCH transmissions not subject to ULCI may also be beneficial.

In another example, one PUSCH with beam 1 and another PUSCH with beam 2 may be scheduled for UE1. Simultaneous PUSCH transmissions of the two beams may also benefit from using spatial parameters to subject one of the two beams to ULCI.

In the examples shown in FIG. 11 (with variations described above), UL beam 1 and UL beam 2 are shown to be transmitted to the TRP1 and TRP2, respectively. However, single-TRP transmissions (especially in FR2) would also benefit from the techniques disclosed herein as two beams received at the same TRP (i.e., one beam from a URLLC UE, and another beam (beam 2) from eMBB UE) may not interfere with each other while another two beams received at the same TRP (i.e. one beam from URLLC UE, and another beam (beam 1) from eMBB UE) may interfere with each other.

Figure 12:
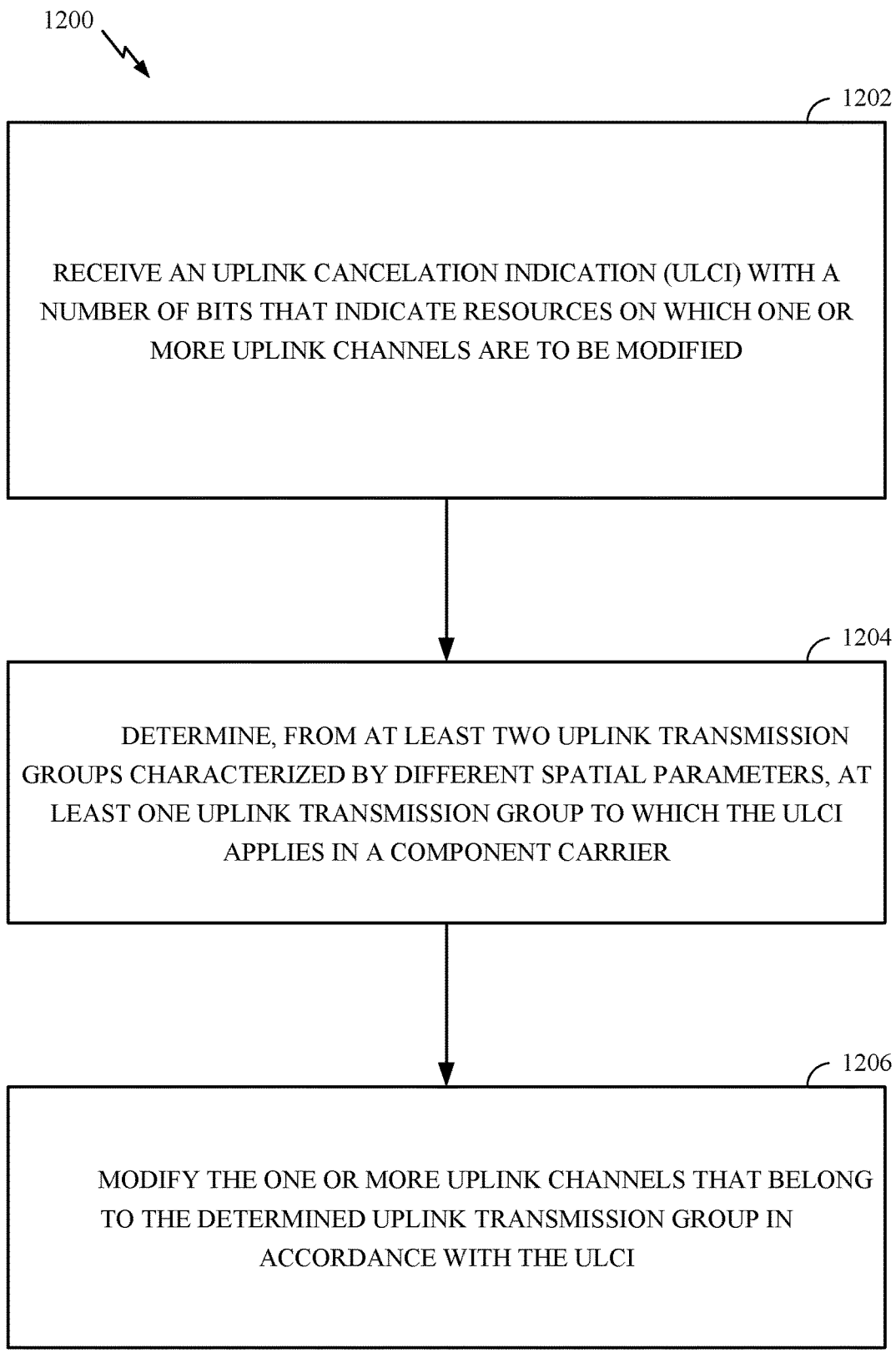
FIG. 12 illustrates example operations for wireless communication by a user equipment, in accordance with certain aspects of the present disclosure.

FIG. 12 illustrates example operations 1200 for wireless communications by a user equipment (UE), in accordance with certain aspects of the present disclosure. Operations 1200 may be performed, for example, by a UE such as a UE 120 of FIG. 1 to process ULCI sent by a base station and apply the ULCI to PUSCH transmissions.

Operations 1200 begin, at 1202, by receiving an uplink cancelation indication (ULCI) with a number of bits that indicate resources on which one or more uplink channels are to be modified. At 1204, the UE determines, from at least two uplink transmissions groups characterized by different spatial parameters, at least one uplink transmission group to which the ULCI applies in a component carrier. At 1206, the UE modifies the one or more uplink channels that belong to the determined uplink transmission group in accordance with the ULCI.

Figure 13:
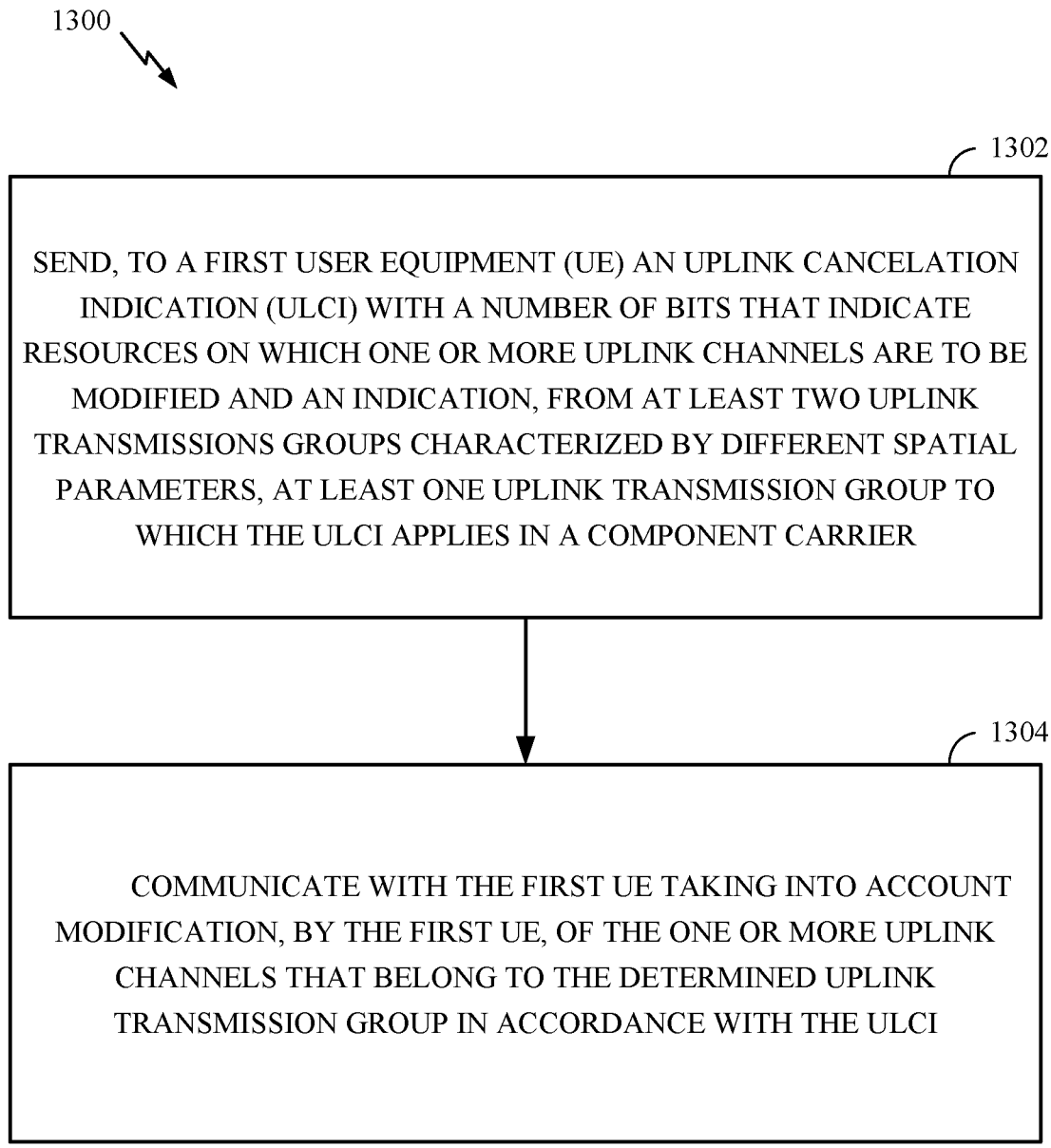
FIG. 13 illustrates example operations for wireless communication by a network entity, in accordance with certain aspects of the present disclosure.

FIG. 13 is a flow diagram showing example operations 1300 for wireless communications by a network entity that may be considered complementary to operations 1200 of FIG. 12. For example, operations 1300 may be performed by a BS 110 of FIG. 1 to generate and send ULCI to a UE performing operations 1200 of FIG. 12.

Operations 1300 begin, at 1302, by sending, to a first UE an ULCI with a number of bits that indicate resources on which one or more uplink channels are to be modified and an indication, from at least two uplink transmissions groups characterized by different spatial parameters, at least one uplink transmission group to which the ULCI applies in a component carrier. At 1304, the network entity communicates with the first UE taking into account modification, by the first UE, of the one or more uplink channels that belong to the determined uplink transmission group in accordance with the ULCI.

For example, modifying the one or more uplink channels includes at least partially cancelling the one or more uplink channels if the resources indicated in the ULCI overlap with the resources of the one or more uplink channels. The one or more uplink channels may include at least one of one or more PUSCHs or one or more PUSCH repetitions.

In some aspects, for both operations 1200 and 1300, the determination of at least one uplink transmission group to which ULCI applies is based on at least one CI field of a DCI that carries the ULCI.

Figure 14:
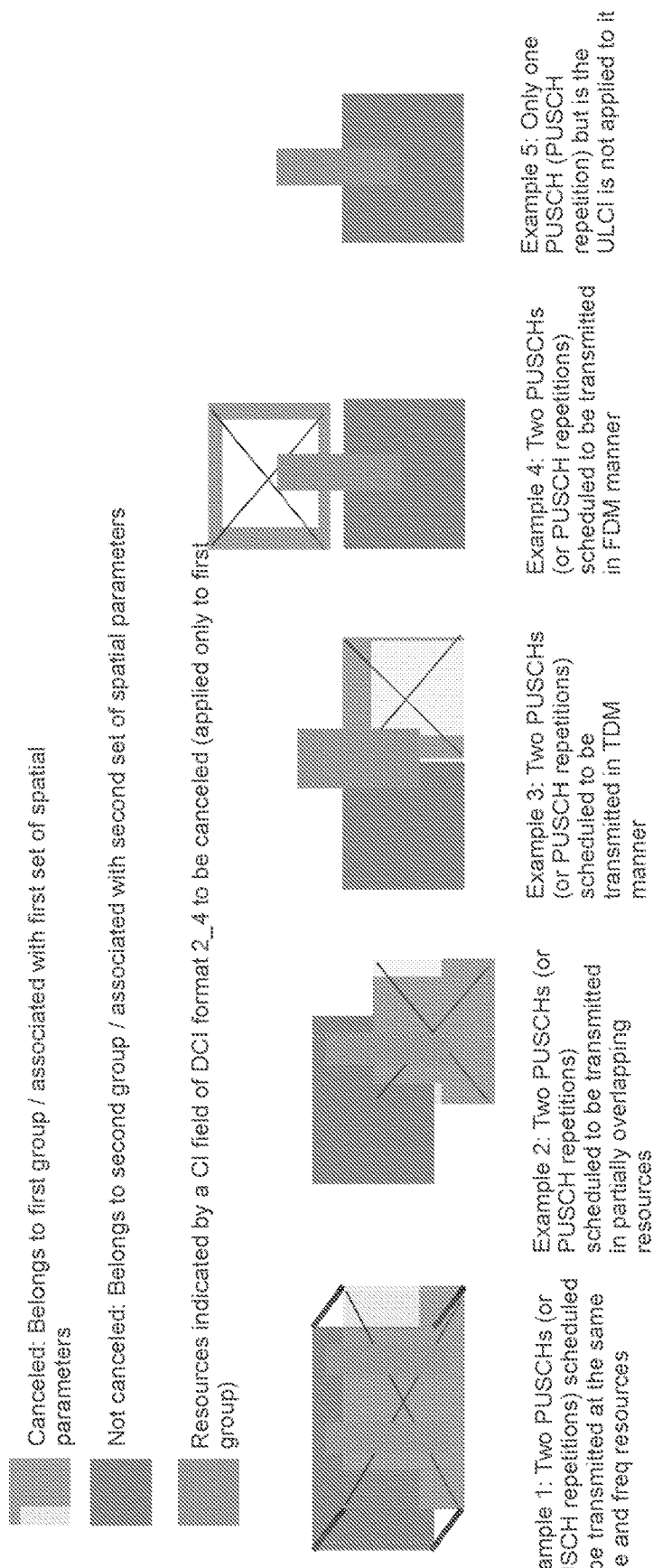
FIG. 14 illustrates examples of applications of ULCI to two or more groups of physical uplink shared channel transmissions having different spatial parameters, in accordance with certain aspects of the present disclosure.

FIG. 14 illustrates multiple examples of applications of ULCI to two or more groups of physical uplink shared channel transmissions having different spatial parameters, according to operations 1200 and 1300. As shown in the examples of FIG. 14, the ULCI is applied to a first group of PUSCH transmissions (or PUSCH repetitions) characterized by a first set of spatial parameters while is not applied to a second group of PUSCH transmissions (or PUSCH repetitions) characterized by a second set of spatial parameters in the same CC.

The examples 1-5 are illustrated using resources indicated by three levels of shadings. A first level of shadings indicates cancelled resources that belong to first group/associated with first set of spatial parameters. A second level of shadings indicates resources not canceled and belong to second group. The resources are associated with second set of spatial parameters. Finally, a third level of shadings indicates resources indicated by a CI field of DCI format 2_4 to be canceled (applied only to first group).

In the first example, there are two PUSCHs (or PUSCH repetitions) that are scheduled to be transmitted using the same time and frequency resources. The first group of transmissions associated with the first set of spatial parameters is cancelled.

In the second example, the two PUSCHs (or PUSCH repetitions) are scheduled to be transmitted in the partially overlapping resources as shown.

In the third example, two PUSCH repetitions (or PUSCHs) are scheduled to be transmitted in TDM manner. As shown, the second repetition of the PUSCH is canceled in view of the resources indicated by the CI field of DCI, which is applied to the first group.

In the fourth example, the two PUSCHs (or PUSCH repetitions) are scheduled to be transmitted in FDM manner. One group of PUSCH transmissions is cancelled.

In the last example, because there is only one group of uplink transmissions, the uplink transmissions are not subject to the ULCI.

FIG. 15A illustrates example CI fields in a DCI (e.g., DCI format 2_4), in accordance with certain aspects of the present disclosure. In one aspect, the DCI has multiple CI fields for the component carrier. Each of the CI fields is associated with one or more uplink transmission groups. For example, a CI field in DCI format 2_4 configured for a CC index can be associated with the first group only, the second group only or both groups. In some cases, the UE receives RRC signaling that indicates the association between CI fields and uplink transmission groups.

As shown in the example, for each CI field (corresponding to a CC index and one or more groups), UE is configured with a starting position in the DCI. For one CC (e.g., CC2/servingCellId=2), one CI field is associated with the first group only and another CI field is associated with the second group only. For another CC (e.g., CC5/servingCellId=5), one CI field is associated with both groups.

As illustrated in FIG. 15B, in some cases, one or more bits in the CI field may indicate one or more uplink transmissions groups. In other words, the one or more groups that are associated with a CI field are indicated as part of the CI field. The first one or more bits of the CI field indicate whether the remaining bits (corresponding to the RB-symbol group bitmap) should be applied to the first group/second group (or both). When the UL transmission does not belong to any group, each CI field may be applied to the uplink transmission; or alternatively, none of the CI field is applied to the uplink transmission.

In some aspects, different PDCCH monitoring occasions are associated with different uplink transmission groups. The determination is based on association of the PDCCH monitoring occasion in which the ULCI is received with at least the determined uplink transmission group. For example, the PDCCH monitoring occasions can be associated with the first group only, second group only or both groups. If DCI format 2_4 is monitored in a first/second PDCCH occasion, the indicated CI field(s) is associated with first/second group, respectively. In some aspects, different PDCCH monitoring occasions associated with different uplink transmission groups belongs to different search space (SS) sets. When belonging to different SS sets, the associated group(s) can be configured as part of SS set configurations). The UE may receive SS set configuration indicating the associated uplink transmission groups.

In some aspects, the determination is based on an association between a control resource set (CORESET) pool index of the CORESET in which the ULCI is received and one or more uplink transmission groups. For example, if DCI format 2_4 is received in a first or second CORESET that is associated with CORESETPoolIndex valued 0 or 1, the indicated CI field(s) can be applied to the first group or second group, respectively. In particular, CORESETPoolIndex supports multi-DCI based multi-TRP. Each CORESET may be associated with one of the values 0 or 1 that groups the CORESETs in to two groups.

In some aspects, more than one CI field can exist in DCI format 2_4 for a UE and a given CC index. The indicated resources in a CI field are applied only to UL transmissions (specifically PUSCH, PUSCH repetition, or SRS) that belong to the group(s) that are configured for or indicated in that CI field, or are associated with the DCI that includes the CI field. The indication does not impact UL transmissions that belong to other group(s).

The uplink transmission groups to which ULCI may be selectively applied (e.g., for a PUSCH or a PUSCH repetition) may be defined in various manners. In some implementations, the uplink transmission groups may be defined based on a CORESET Pool Index of a CORESET in which a DCI that schedules the uplink transmission is received.

In some implementations, the uplink transmission groups are defined based on an uplink beam group. For example, the uplink transmission groups are defined based on at least one or a UE panel ID that determines the UL beam group; an uplink transmission configuration indicator (TCI) field; or at least one of a sounding reference signal (SRS) resource set ID, SRS resource ID, or SRS resource indicator (SRI)

codepoint. For example, the DCI that schedules PUSCH may indicate one or more SRS resources by the SRI field of the DCI.

In some implementations, the uplink transmission groups are defined based on an uplink power control closed loop index associated with the uplink transmission. For example, there are two closed loop indices (0 and 1) for two closed loop power control for different PUSCH transmissions in the same CC.

In some implementations, the uplink transmission groups are defined based on at least one or antenna ports (e.g., PUSCH, SRS, or DMRS) or one or more code division multiplexed (CDM) groups that the antenna ports belong to. For example, an SRI field in UL DCI may indicate whether PUSCH. PUSCH/SRS ports are applicable, while DMRS ports are determined from a "antenna port(s) field" of UL DCI.

In some implementations, the uplink transmission groups are defined based on one or more timing advance group (TAG) IDs, for example, when the two uplink transmission groups have different time advance for UL transmission.

In some implementations, the uplink transmission groups are defined based on a physical cell identifier (PCI) or synchronization signal block (SSB) set associated with the uplink transmission, for example, in inter-cell multi-TRP situations where there are serving cell(s) and non-serving cell(s).

Figure 16:
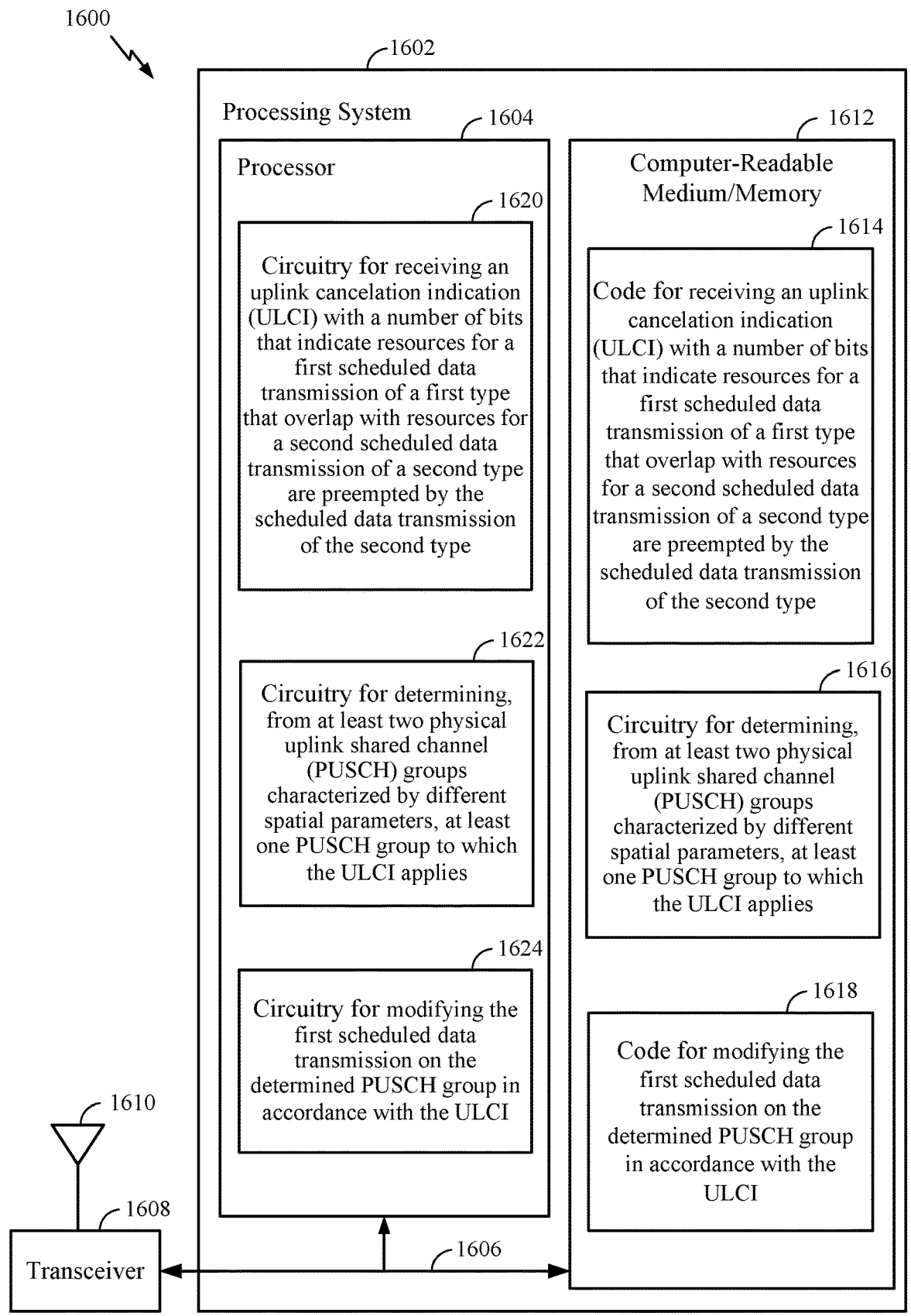
FIG. 16 illustrates a communications device that may include various components configured to perform operations for the techniques disclosed herein, in accordance with aspects of the present disclosure.

FIG. 16 illustrates a communications device 1600 (e.g., a UE) that may include various components (e.g., corresponding to means-plus-function components) configured to perform operations for the techniques disclosed herein, such as the operations 1200 illustrated in FIG. 12. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations 1200 illustrated in FIG. 12, or other operations for performing the various techniques discussed herein. In certain aspects, computer-readable medium/memory 1612 stores code 1614 for receiving an uplink cancelation indication (ULCI) with a number of bits that indicate resources for a first scheduled data transmission of a first type that overlap with resources for a second scheduled data transmission of a second type are preempted by the scheduled data transmission of the second type, code 1616 for determining, from at least two physical uplink shared channel (PUSCH) groups characterized by different spatial parameters, at least one PUSCH group to which the ULCI applies, and code 1618 for modifying the first scheduled data transmission on the determined PUSCH group in accordance with the ULCI. In certain aspects, the processor 1604 has circuitry configured to implement the code stored in the computer-readable medium/memory 1612. The processor 1604 includes circuitry 1619 for transmitting, to a network entity, capability signaling indicating a capability of the UE in switching among multiple component carriers (CCs), circuitry 1620 for receiving an uplink cancelation indication (ULCI) with a number of bits that indicate resources for a first scheduled data transmission of a first type that overlap with resources for a second scheduled data transmission of a second type are preempted by the scheduled data transmission of the second type, circuitry 1622 for determining, from at least two physical uplink shared channel (PUSCH) groups characterized by different spatial parameters, at least one PUSCH group to which the ULCI applies, and circuitry 1624 for modifying the first scheduled data transmission on the determined PUSCH group in accordance with the ULCI.

Figure 17:
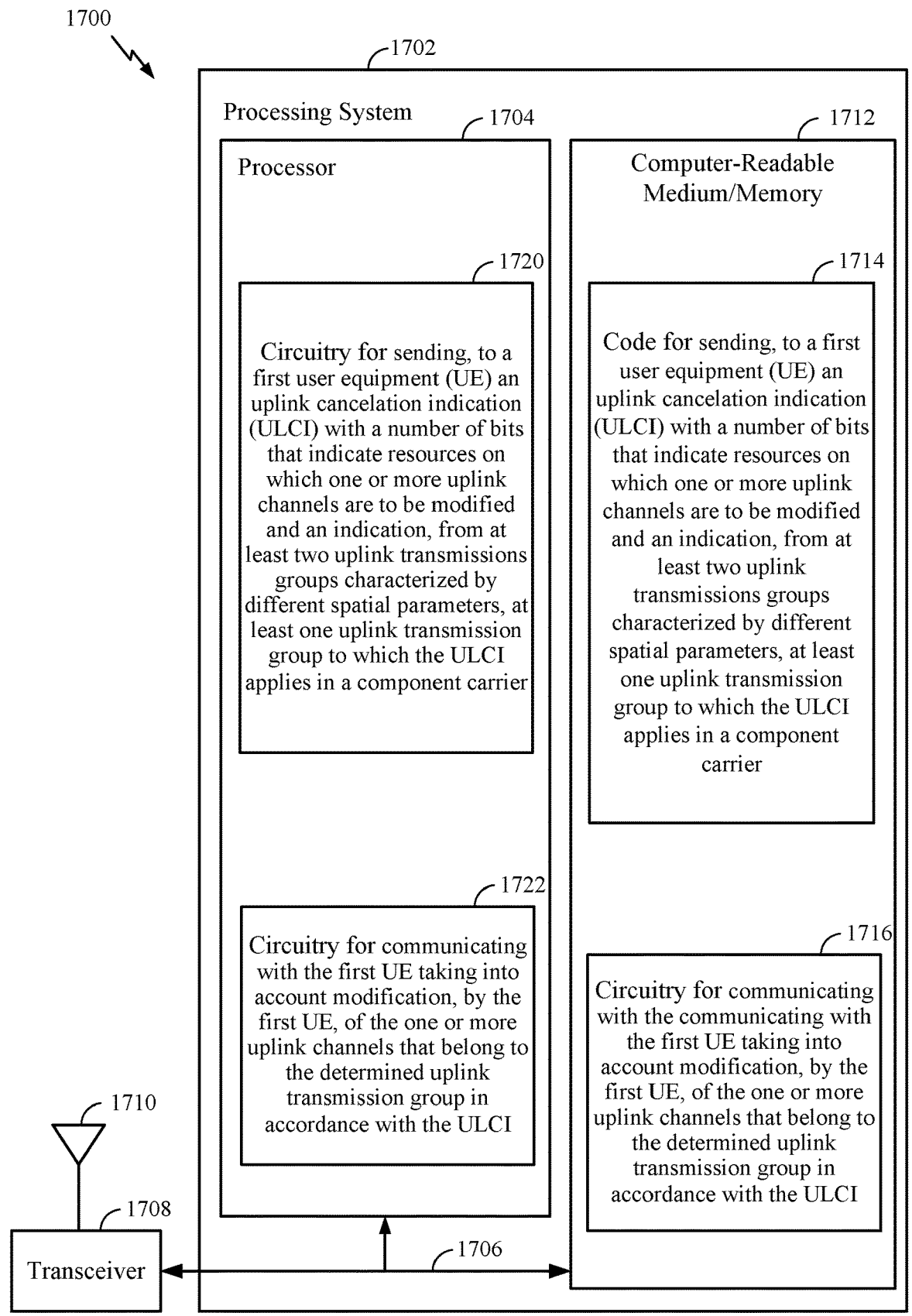
FIG. 17 illustrates a communications device that may include various components configured to perform operations for the techniques disclosed herein, in accordance with aspects of the present disclosure.

FIG. 17 illustrates a communications device 1700 (e.g., a UE) that may include various components (e.g., corresponding to means-plus-function components) configured to perform operations for the techniques disclosed herein, such as the operations 1300 illustrated in FIG. 13. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations 1300 illustrated in FIG. 13, or other operations for performing the various techniques discussed herein. In certain aspects, computer-readable medium/memory 1712 stores code 1714 for sending, to a first user equipment (UE) an uplink cancelation indication (ULCI) with a number of bits that indicate resources on which one or more uplink channels are to be modified and an indication, from at least two uplink transmissions groups characterized by different spatial parameters, at least one uplink transmission group to which the ULCI applies in a component carrier, and code 1716 for communicating with the first UE taking into account modification, by the first UE, of the one or more uplink channels that belong to the determined uplink transmission group in accordance with the ULCI. In certain aspects, the processor 1704 has circuitry configured to implement the code stored in the computer-readable medium/memory 1712. The processor 1704 includes circuitry 1719 for transmitting, to a network entity, capability signaling indicating a capability of the UE in switching among multiple component carriers (CCs), circuitry 1720 for sending, to a first user equipment (UE) an uplink cancelation indication (ULCI) with a number of bits that indicate resources on which one or more uplink channels are to be modified and an indication, from at least two uplink transmissions groups characterized by different spatial parameters, at least one uplink transmission group to which the ULCI applies in a component carrier, and circuitry 1722 for communicating with the first UE taking into account modification, by the first UE, of the one or more uplink channels that belong to the determined uplink transmission group in accordance with the ULCI.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1200 of FIG. 12 may be performed by the various processors of the UE 120 shown in FIG. 4, while operations 1300 of FIG. 13 may be performed by the various processors of the base station 110 shown in FIG. 4

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 12 and FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), the method comprising:
    receiving, in a physical downlink control channel (PDCCH) monitoring occasion, an uplink cancelation indication (ULCI) with a number of bits that indicate resources on which one or more uplink channels are to be modified;
    determining, from at least two uplink transmission groups characterized by different spatial parameters, at least one uplink transmission group to which the ULCI applies in a component carrier, wherein the determination is based on (i) one or more bits in a CI field of the ULCI that explicitly indicate the at least one uplink transmission group or (ii) an association of the PDCCH monitoring occasion with the at least one uplink transmission group; and
    modifying the one or more uplink channels that belong to the at least one uplink transmission group in accordance with the ULCI.

2. The method of claim 1, wherein modifying the one or more uplink channels comprises at least partially canceling the one or more uplink channels if the resources indicated in the ULCI overlap with the resources of the one or more uplink channels.

3. The method of claim 1, wherein the one or more uplink channels comprise at least one of: one or more physical uplink shared channels (PUSCHs) or one or more PUSCH repetitions.

4. The method of claim 1, wherein the determination is based on at least one cancelation indication (CI) field of a downlink control information (DCI) that carries the ULCI.

5. The method of claim 4, wherein the DCI has multiple CI fields for the component carrier, each associated with one or more PUSCH groups.

6. The method of claim 4, further comprising, if an uplink transmission is not associated with an uplink transmission group:
    applying each CI field of the DCI to the uplink transmission; or
    not applying any CI field of the DCI to the uplink transmission.

7. The method of claim 1, wherein:
    the PDDCH monitoring occasion is one of a set of different PDCCH monitoring occasions associated with different uplink transmission groups, and wherein two or more of the different PDCCH monitoring occasions belong to different search space (SS) sets; and
    the method further comprises receiving an SS set configuration indicating the associated uplink transmission groups.

8. The method of claim 1, wherein uplink transmission groups are defined based on a control resource set (CORESET) pool index of a CORESET in which a downlink control information (DCI) that schedules an uplink transmission is received.

9. The method of claim 1, wherein uplink transmission groups are defined based on an uplink beam group.

10. The method of claim 9, wherein the uplink transmission groups are defined based on at least one of:
    a UE panel ID that determines a UL beam group;
    an uplink transmission configuration indicator (TCI) field; or
    at least one of a sounding reference signal (SRS) resource set ID or SRS resource ID.

11. The method of claim 1, wherein the uplink transmission groups are defined based on an uplink power control closed loop index associated with an uplink transmission.

12. The method of claim 1, wherein the uplink transmission groups are defined based on at least one of:
   antenna ports or one or more code division multiplexed (CDM) groups that the antenna ports belong to;
   one or more timing advance group (TAG) IDs; or
   a physical cell identifier (PCI) or synchronization signal block (SSB) set associated with an uplink transmission.

13. A method for wireless communication by a network entity, the method comprising:
   sending, in a physical downlink control channel (PDCCH) monitoring occasion, to a first user equipment (UE) an uplink cancelation indication (ULCI) with a number of bits that indicate resources on which one or more uplink channels are to be modified and an indication, from at least two uplink transmission groups characterized by different spatial parameters, of at least one uplink transmission group to which the ULCI applies in a component carrier, wherein the indication comprises (i) one or more bits in the CI field of the ULCI that explicitly indicate the at least one uplink transmission group or (ii) the PDCCH monitoring that indicates the at least one uplink transmissions group via an association of the PDCCH monitoring occasion with the at least one uplink transmission group; and
   communicating with the first UE taking into account modification, by the first UE, of the one or more uplink channels that belong to the at least one uplink transmission group in accordance with the ULCI.

14. The method of claim 13, further comprising:
   determining one or more uplink transmissions of the first UE are of a first service type and overlap with one or more uplink transmissions of a second UE of a second service type; and
   sending the ULCI to the first UE based on the determination.

15. The method of claim 13, wherein modifying the one or more uplink channels by the first UE comprises at least partially canceling the one or uplink channels if the resources indicated in the ULCI overlap with the resources of the one or more uplink channels.

16. The method of claim 13, wherein the one or more uplink channels comprise at least one of: one or more physical uplink shared channels (PUSCHs) or one or more PUSCH repetitions.

17. The method of claim 13, wherein the indication of the uplink transmission group to which the ULCI applies is provided via at least one cancelation indication (CI) field of a downlink control information (DCI) that carries the ULCI.

18. The method of claim 17, wherein the DCI has multiple CI fields for the component carrier, each associated with one or more PUSCH groups.

19. The method of claim 13, wherein:
   the PDDCH monitoring occasion is one of a set of different PDCCH monitoring occasions associated with different uplink transmission groups, and wherein two or more of the different PDCCH monitoring occasions belong to different search space (SS) sets; and
   the method further comprises sending the first UE an SS set configuration indicating the associated uplink transmission groups.

20. The method of claim 13, wherein uplink transmission groups are defined based on a control resource set (CORESET) pool index of a CORESET in which a downlink control information (DCI) that schedules an uplink transmission is received.

21. The method of claim 13, wherein uplink transmission groups are defined based on an uplink beam group.

22. The method of claim 21, wherein the uplink transmission groups are defined based on at least one of:
   a UE panel ID that determines a UL beam group;
   an uplink transmission configuration indicator (TCI) field; or
   at least one of a sounding reference signal (SRS) resource set ID or SRS resource ID.

23. The method of claim 13, wherein the uplink transmission groups are defined based on at least one of:
   an uplink power control closed loop index associated with an uplink transmission;
   antenna ports or one or more code division multiplexed (CDM) groups that the antenna ports belong to; or
   one or more timing advance group (TAG) IDs.

24. The method of claim 13, wherein the uplink transmission groups are defined based on a physical cell identifier (PCI) or synchronization signal block (SSB) set associated with an uplink transmission.

25. An apparatus comprising:
   one or more memories storing computer executable code; and
   one or more processors configured to execute the computer executable code and cause the apparatus to:
      receive, in a physical downlink control channel (PDCCH) monitoring occasion, an uplink cancelation indication (ULCI) with a number of bits that indicate resources on which one or more uplink channels are to be modified;
      determine, from at least two uplink transmission groups characterized by different spatial parameters, at least one uplink transmission group to which the ULCI applies in a component carrier, wherein the determination is based on (i) one or more bits in the CI field of the ULCI that explicitly indicate the at least one uplink transmission group or (ii) an association of the PDCCH monitoring occasion with the at least one uplink transmission group; and
      modify the one or more uplink channels that belong to the at least one uplink transmission group in accordance with the ULCI.

26. An apparatus comprising:
   one or more memories storing computer executable code; and
   one or more processors configured to execute the computer executable code and cause the apparatus to:
      send, in a physical downlink control channel (PDCCH) monitoring occasion, to a user equipment (UE) an uplink cancelation indication (ULCI) with a number of bits that indicate resources on which one or more uplink channels are to be modified and an indication, from at least two uplink transmission groups characterized by different spatial parameters, of at least one uplink transmission group to which the ULCI applies in a component carrier, wherein the indication comprises (i) one or more bits in the CI field of the ULCI that explicitly indicate the at least one uplink transmission group or (ii) the PDCCH monitoring that indicates the at least one uplink transmissions group via an association of the PDCCH monitoring occasion with the at least one uplink transmission group; and
      communicate with the UE taking into account modification, by the UE, of the one or more uplink channels that belong to the at least one uplink transmission group in accordance with the ULCI.

27. An apparatus for wireless communication, the apparatus comprising:
- means for receiving, in a physical downlink control channel (PDCCH) monitoring occasion, an uplink cancelation indication (ULCI) with a number of bits that indicate resources on which one or more uplink channels are to be modified;
- means for determining, from at least two uplink transmission groups characterized by different spatial parameters, at least one uplink transmission group to which the ULCI applies in a component carrier, wherein the determination is based on (i) one or more bits in the CI field of the ULCI that explicitly indicate the at least one uplink transmission group or (ii) an association of the PDCCH monitoring occasion with the at least one uplink transmission group; and
- means for modifying the one or more uplink channels that belong to the at least one uplink transmission group in accordance with the ULCI.

* * * * *